C. L. BUBB.

AUTOMATIC OILER.

APPLICATION FILED NOV. 19, 1920.

Reissued Jan. 17, 1922. 15,267.

INVENTOR
CHARLES L. BUBB
BY Wm. M. Cady
ATTORNEY

UNITED STATES PATENT OFFICE.

CHARLES L. BUBB, OF WILLIAMSPORT, PENNSYLVANIA, ASSIGNOR TO WESTINGHOUSE AIR BRAKE COMPANY, OF WILMERDING, PENNSYLVANIA, A CORPORATION OF PENNSYLVANIA.

AUTOMATIC OILER.

15,267. Specification of Reissued Letters Patent. Reissued Jan. 17, 1922.

Original No. 1,337,687, dated April 20, 1920, Serial No. 321,395, filed September 3, 1919. Application for reissue filed November 19, 1920. Serial No. 425,265.

*To all whom it may concern:*

Be it known that I, CHARLES L. BUBB, a citizen of the United States, residing at Williamsport, in the county of Lycoming and State of Pennsylvania, have invented new and useful Improvements in Automatic Oilers, of which the following is a specification.

This invention relates to an automatic oiler or lubricator for air compressors particularly of that type designed to supply air for the train brakes and locomotive accessories on steam trains, and carried as a part of the essential equipment of every steam locomotive.

A primary object of this invention is to provide an air pump lubricator that is reliable and efficient in use and requires only a minimum amount of attention and when the pump is not in operation it ceases to function thus saving a vast amount of lubricant that is usually wasted with devices that feed regardless of the pump operation.

Another object of this invention is to provide an air compressor lubricator that will feed the required amount of lubricant to the compressor to keep the piston and cylinder walls in perfect working order thus tending to increase the life of the compressor as well as to add to the efficiency of the train mechanism in general.

A still further object of this invention is to provide a compressor lubricator that is compact and easily manufactured at a minimum cost and will with reasonable care last the life of the compressor.

With the above and other objects in view this invention consists in the novel construction, combination and arrangement of parts as will be hereinafter fully pointed out, illustrated and claimed.

It will be quite well understood by those skilled in the art to which this invention belongs, that the same is susceptible of considerable change in design without departing from the spirit or scope of the invention, but a preferred and thoroughly practical embodiment thereof is shown in the accompanying drawings in which:—

Figure 2:
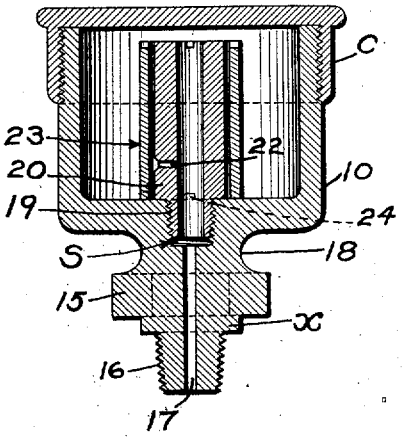
Fig. 2 is a central section of my improved compressor lubricator and shows all the elements necessary for its successful operation associated therewith.
Figure 3:
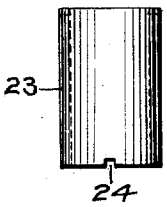

Figs. 3 and 3ª are respectively an elevation and an inverted plan view of the sleeve which is shown in position in Fig. 2 of the drawings.

Figure 4:
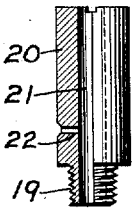

Figs. 4 and 4ª are respectively a sectional elevation and bottom plan view of the stem which is designed to coact with the sleeve shown in Fig. 3.

Figure 5:
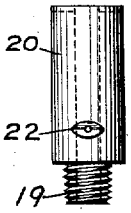
Figure 3A:
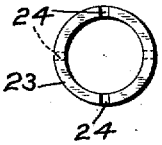
Figure 4A:
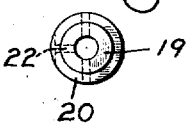
Figure 1:
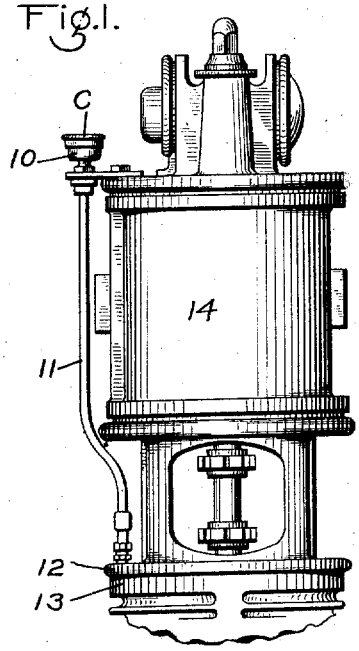
Figure 1 is a view of a well known type of air compressor having my invention attached thereto.

Fig. 5 is an elevation of the stem which is shown in Fig. 4, rotated a quarter turn to show the radial opening therein.

Similar reference numerals refer to similar parts throughout the several figures of the drawings.

In carrying out this invention no change is contemplated in the air compressor and the novel lubricator designated in its entirety by the numeral 10 is attached to a feed pipe 11 extending from the lubricator to the top 12 of the compressor 13, which is operated by a piston within the steam cylinder 14.

The body of the lubricator 10 is preferably circular or cup like in shape and has its lower part formed with a hexagonal portion 15, threaded stem 16, and a collar *x*. The body portion is further provided with a filling cap C which is preferably internally threaded to permit of its being screwed down on the body 10 to prevent the waste of lubricant.

The body 10 is further provided with a lubricant discharge passage 17 which extends through the neck portion 18 of the body and communicates with the enlarged and preferably threaded socket portion S that is adapted to receive the threaded nipple 19 of a tube 20 which is shown in position in Fig. 2 of the drawings. The said tube 20 is provided with a longitudinal bore 21, which registers with the opening 17 when the parts are assembled as shown in Fig. 2, and is further provided with a radial intake opening 22 which is preferably provided with a flared mouth portion on the surface of the tube. For the purpose of screwing the tube into place the upper end thereof is provided with a plurality of notches diagonally opposite each other which receive a wrench or similar tool.

Cooperating with the tube 20 there is a sleeve 23, the inside diameter of which is preferably made $\frac{1}{64}''$ larger than the finished diameter of the tube 20, and its opposite ends are preferably provided with the notches 24 so that in assembling no mistake can be made whereby the lubricant may be excluded from the annular space between the tube and sleeve. This relatively restricted space between the concentric members forms a gage chamber or passage for the oil fed to the passage 17.

The operation of this lubricator may be described as follows:—Assuming that the same is properly connected to an air compressor, and the lubricant chamber properly filled with lubricant and the cap screwed down in place, the lubricant in the cup will flow through the notches 24, into the space between the sleeve 23 and the tube 20 and the lubricant will rise in said space by capillary attraction and will then enter the flared mouth of the radial opening 22, whence the lubricant flows through the opening 22 to the bore 21 from which the lubricant flows by gravity to the compressor cylinder. The proper amount of oil necessary to lubricate an air compressor has been the subject of exhaustive experiments made by the Pennsylvania Railroad Company and the relative size and proportions as well as the manner of making each essential part of the above described lubricator has been determined by these tests.

One of the important features of the invention consists broadly in providing a feed passage through which lubricant is supplied from the oil cup to the discharge passage, the flow capacity of which is very limited and yet is of such extent that the passage will not become clogged so as to prevent the flow of the lubricant.

I have shown and described a preferred construction in which a restricted feed passage of the above character is provided, but it will be apparent that such a feed passage may be provided by other structural designs without departing from the scope of the invention.

With the above description of this improved lubricator its many advantages are thought to be sufficiently set forth.

Having now described my invention, what I claim as new and desire to secure by Letters Patent, is:—

1. An automatic lubricating device for air compressors including a lubricant holding cup having a discharge passage communicating with the compressor, a sealing cap for the cup, a tubular member fitted to the cup and communicating with the discharge passage thereof and having a radial lubricant intake opening, and a sleeve loosely telescoping with the tubular member and spaced therefrom to provide a restricted annular oil feeding passage in communication with the said radial opening, and said sleeve member having means for establishing communication between the annular passage and the lubricant holding portion of the cup.

2. An automatic lubricating device for air compressors including a lubricant holding cup provided with a discharge passage communicating with the air compressor, a sealing cap for the cup, a perforate tubular member fitted to the cup in communication with said discharge passage, and a sleeve member loosely telescoping with the tubular member and spaced therefrom to provide a restricted oil feeding passage, said sleeve member having a lubricant passage for establishing communication between the lubricant holding portion of the cup and the said restricted passageway, said lubricant passage being out of registry with the perforate portion of the tubular member.

3. An automatic lubricating device for air compressors including a lubricant holding cup having a discharge passage in communication with the air compressor, said passage communicating with an enlarged socket portion in the bottom of the lubricant holding chamber of the cup, a tubular member having a radial intake opening and a threaded nipple portion adapted to fit in said socket, and an external sleeve provided with notched end portions fitted over said tubular member and providing a restricted oil passage therebetween.

4. An automatic lubricating device for air compressors including a lubricant holding cup having a discharge passage in communication with the air compressor, a sealing cap for the cup, a tubular member provided with a radial opening and having its lower end fitted to the cup in registry with the discharge passage while its upper end extends above the mean lubricant level of the lubricant chamber, and a notched sleeve telescopically fitted over said tube and spaced therefrom to provide a relatively restricted oil passage leading from the main lubricant holding chamber to the radial opening of the tube.

5. A lubricating device comprising a cup having a chamber for holding a lubricant and containing a member having a lubricant discharge passage and a second member spaced from the first to provide a relatively restricted oil passage opening to said chamber at opposite ends of the second member, the first member having a passage connecting the restricted oil passage with the said discharge passage.

In testimony whereof I have hereunto set my hand.

CHARLES L. BUBB.